United States Patent
Fatehi et al.

(10) Patent No.: US 6,317,255 B1
(45) Date of Patent: Nov. 13, 2001

(54) METHOD AND APPARATUS FOR CONTROLLING OPTICAL SIGNAL POWER IN RESPONSE TO FAULTS IN AN OPTICAL FIBER PATH

(75) Inventors: Mohammad Taghi Fatehi; Bruce Lee Nelson, both of Middletown; Kamal Kumar Raychaudhuri, Red Bank, all of NJ (US)

(73) Assignee: Lucent Technologies Inc., Murray Hill, NJ (US)

(*) Notice: Subject to any disclaimer, the term of this patent is extended or adjusted under 35 U.S.C. 154(b) by 0 days.

(21) Appl. No.: 09/067,909

(22) Filed: Apr. 28, 1998

(51) Int. Cl.[7] ............... H01S 3/30; G02B 6/34; H04B 10/08
(52) U.S. Cl. ............ 359/341.44; 359/177; 385/12
(58) Field of Search ................. 359/177, 337, 359/341, 169, 170, 341.44; 385/12, 123

(56) References Cited

U.S. PATENT DOCUMENTS

| | | | |
|---|---|---|---|
| 4,911,515 | * 3/1990 | So et al. ................. | 359/177 |
| 5,218,608 | 6/1993 | Aoki ........................ | 372/6 |
| 5,355,250 | * 10/1994 | Grasso et al. ............ | 359/341 |
| 5,475,521 | * 12/1995 | Heiemann ................ | 359/177 |
| 5,504,617 | * 4/1996 | Spirit ....................... | 359/341 |
| 5,664,131 | * 9/1997 | Sugiya ..................... | 359/341 |
| 5,680,246 | * 10/1997 | Takahashi et al. ...... | 359/341 |
| 5,812,710 | * 9/1998 | Sugaya .................... | 385/27 |
| 5,818,629 | * 10/1998 | Kinoshita ................ | 359/341 |

FOREIGN PATENT DOCUMENTS

| | | |
|---|---|---|
| 2304452 | * 3/1997 | (GB). |
| 5-291667 | * 11/1993 | (JP). |
| 07015055 | * 1/1995 | (JP). |

OTHER PUBLICATIONS

Sato et al, IEEE Photonics Tech. Letters, vol. 3, #11, Nov. 1991 pp. 1001–1003;Abst. Only Herewith.*
Sugaya et al, OAA '95,paper Fc3, pp 3–6, Jun. 16, 1995.*
Nakagawa et al, Bit Rate Flexible Transmission Field Trial . . . , NTT Transmission System Labs, PDP11–1; pp. 341–343, Oct. 1995.*

U.S. patent application Ser. No. 08/932,679, filed on Sep. 18, 1997 entitled "Optical Transmission Line Automatic Power Shut–down System" by Vibha Prakash Goel et al.

* cited by examiner

Primary Examiner—Nelson Moskowitz
(74) Attorney, Agent, or Firm—Gregory J. Murgia

(57) ABSTRACT

Automatic reduction of optical signal power supplied by an upstream network element by a prescribed amount is achieved by capturing and processing reflected optical energy that is generated within the optical fiber path as a result of a downstream fiber cut, open connector, or other potentially hazardous discontinuity. Generally, the power level of the reflected optical signal is detected and measured in the optical fiber path and the optical signal power supplied by the upstream network element is automatically reduced. The optical signal power may either be reduced by an amount corresponding to the measured reflected optical signal power or may be completely shut off until the faulty condition is resolved. In one illustrative embodiment, an apparatus for automatically reducing or shutting off the optical signal power supplied by an upstream network element includes a directional optical transfer device disposed along the optical fiber path and coupled to the output of a network element, an optical power monitor for measuring the reflected optical energy received via the directional optical coupler as a result of a downstream fiber discontinuity, and control circuitry coupled between the power monitor and the network element to control the optical signal power being supplied by the network element based on the monitored power level of the reflected optical signal. The control circuitry may be analog, digital, or may be implemented using a microprocessor operating under software or firmware program control.

22 Claims, 4 Drawing Sheets

METHOD AND APPARATUS FOR CONTROLLING OPTICAL SIGNAL POWER IN RESPONSE TO FAULTS IN AN OPTICAL FIBER PATH

FIELD OF THE INVENTION

This invention relates generally to lightwave communication systems and, more particularly, to techniques for controlling the power level of an optical signal so that harm from the optical signal emanating at a downstream fault in an optical fiber path is substantially reduced.

BACKGROUND OF THE INVENTION

Retinal and other types of eye injury can occur from inadvertent direct exposure to the optical signals used in present communication systems. Danger is presented by the power and the wavelength of such signals. Generally, these systems operate with signals having relatively high power concentrated in a tiny beam located outside the visible region.

Recent developments in optical networking have only heightened existing safety concerns. For example, optical amplifiers and other optical components are now being developed to drive optical signals to even higher output power levels. Multi-wavelength systems are also a concern because the total optical power in the optical fiber is the sum of the powers of the individual wavelength components. Consequently, optical systems having total output power of 20 dBm or more are now being realized as a result of advances in optical amplifier and multi-wavelength optical networking technologies.

Because the extent of injury is most likely proportional to the total output power and the time of exposure, it is necessary to quickly shut off or reduce the output power of a network element in the event of a fiber cut, removed connector, or any other discontinuity in the optical path. In prior arrangements, control of upstream elements relies entirely upon downstream elements nearer to the fault. For example, downstream network elements perform fault detection and localization by monitoring the degradation or interruption of the forward propagating signal, i.e., the signal propagating downstream. If such a degradation or interruption is detected, the network control and management system then communicates the necessary supervisory signals to switch off the upstream network element. This scheme is limited in several ways. First, the scheme will only work for faults that occur between the upstream and downstream elements. Secondly, this scheme will fail if, by virtue of the system failure, the downstream element cannot communicate with the upstream element, e.g., if the supervisory channel is lost as a result of the discontinuity in the optical path. Even if this scheme works, there are other issues of added cost and complexity for such control and the possibility of delay in effecting control.

SUMMARY OF THE INVENTION

Automatic reduction of optical signal power supplied by an upstream network element by a prescribed amount is achieved without the use of downstream control elements by using reflected optical signal power that is generated within the optical fiber path as a result of a downstream fiber cut, open connector, or other potentially hazardous discontinuity. Upon capturing and processing the reflected optical signal power at an upstream position in the optical fiber path, the optical signal power supplied by the upstream network element is automatically reduced. The optical signal power may either be reduced by an amount that is a function of the measured reflected optical signal power or may be completely shut off until the faulty condition is resolved. By using reflected optical signal power within the optical transmission path, the present invention does not require any additional signaling from downstream network elements or from the network control and management system and avoids delay.

In one illustrative embodiment, control circuitry is located at an upstream position to capture and process the reflected optical signal that is generated as a result of the downstream fault. The control circuitry may be coupled to a network element, such as a fiber optical amplifier, to control the output power level of the network element in response to the downstream fault. More specifically, the control circuitry generates a control signal and supplies this control signal to the network element to reduce the output power level of the network element accordingly. Alternatively, upon processing the reflected optical signal, the control circuitry may be used to introduce a predetermined amount of loss into the optical fiber to reduce the optical signal power below harmful levels. The control circuitry may be analog, digital, or may be implemented using a microprocessor under software or firmware program control.

BRIEF DESCRIPTION OF THE DRAWING

A more complete understanding of the present invention may be obtained from consideration of the following detailed description of the invention in conjunction with the drawing, with like elements referenced with like references, in which.

DETAILED DESCRIPTION OF THE INVENTION

Although the principles of the invention are particularly applicable to controlling the optical signal power supplied by a fiber optical amplifier, and shall be described in this context, those skilled in the art will understand from the teachings herein that the principles of the invention are also applicable to many other optical components including, but not limited to, semiconductor optical amplifiers, optical transmitters (e.g., laser sources), add/drop multiplexers, cross-connects, or any element that supplies or propagates optical signals along an optical fiber.

Figure 1:
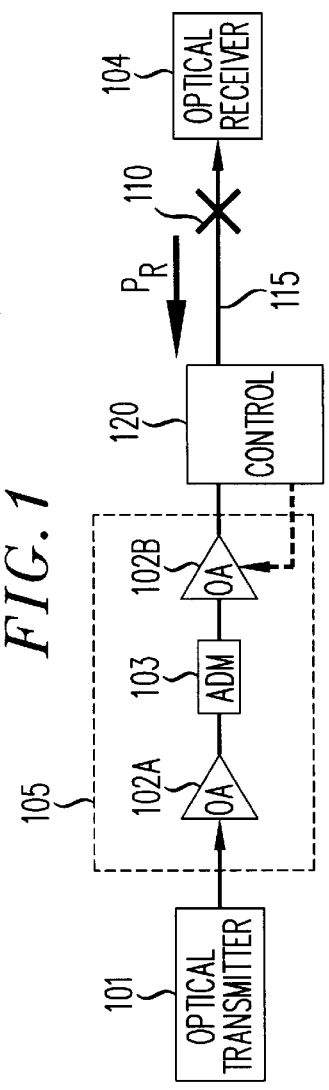
FIG. 1 shows a simplified block diagram of one illustrative lightwave communication system embodying the principles of the present invention.

FIG. 1 shows a typical lightwave communication system that includes an optical transmitter 101, a network element 105, and an optical receiver 104. In this example, network element 105 includes several optical components, such as multiple stages of optical amplifiers 102 and an add/drop multiplexer 103. In general, network element 105 could be any type of simple or complex arrangement of components.

Network element 105 supplies an optical signal having a certain output power level onto optical fiber 115. The optical signal could either be a multi-wavelength optical signal or a single wavelength optical signal. As shown, downstream cut 110 in optical fiber 115 results in a reflection of an optical signal back towards network element 105, wherein the reflected optical signal has a power level $P_R$.

According to one embodiment of the invention, control element 120, which is located at an upstream position, captures and processes the reflected optical signal generated within optical fiber 115 as a result of downstream fault 110. Upon processing the reflected optical signal, control element 120 generates and supplies the appropriate control signal to control the output power of final stage optical amplifier 102B. In particular, control element 120 may be used to control the pump power being supplied to optical amplifier 102B which, in effect, shuts off or reduces to a safe level the output power of optical amplifier 102B. In effect, the optical signal power supplied by optical amplifier 102B is automatically controlled at an upstream position relative to downstream fault 110.

According to another embodiment illustrated in FIG. 1, the optical signal power may be controlled independent of the particular network element supplying the optical signal. More specifically, upon processing the reflected optical signal, control element 120 introduces a predetermined amount of loss in the fiber path at the upstream position in order to reduce the power level of the optical signal emanating from the fiber cut 110. This may be accomplished by switching in a lossy element based on the power level $P_R$ of the reflected optical signal. For example, a fiber optic switch could switch the optical signal through a lossy medium, such as an unpumped erbium-doped fiber segment, once the reflected optical signal power exceeds a prescribed threshold. Those skilled in the art will recognize that other techniques may be employed according to the principles of the invention to reduce optical signal power by, for example, introducing the appropriate amount of loss into optical fiber 115.

Figure 2:
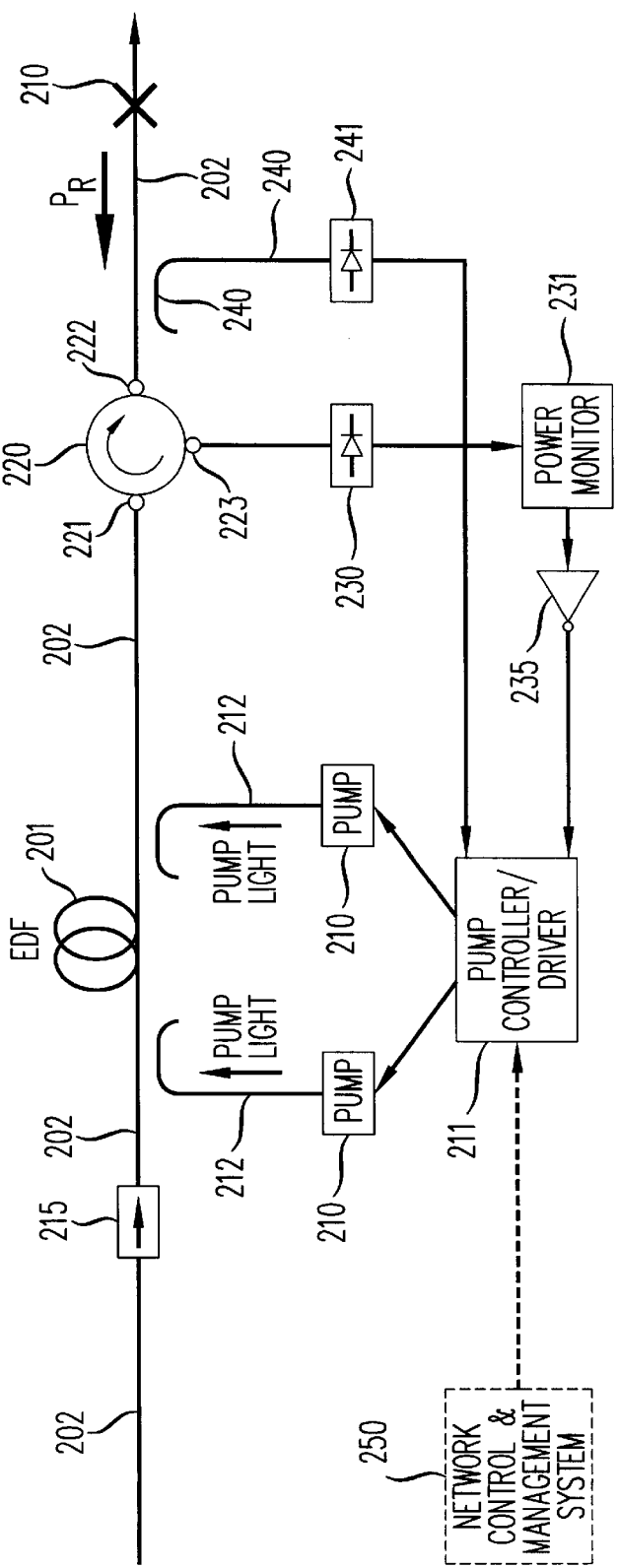
FIG. 2 shows a simplified block diagram of an illustrative fiber optical amplifier arrangement embodying the principles of the present invention.

FIG. 2 shows an illustrative embodiment of the present invention used for controlling the output power level of optical signals from an optical amplifier. More specifically, amplifying element 201 disposed along optical fiber path 202 receives an optical signal and supplies an amplified optical signal downstream along optical fiber path 202. For uniformity and ease of understanding in the following description, amplifying element 201 is contemplated to be a rare earth-doped optical fiber, such as an erbium-doped fiber (EDF segment). However, it is also contemplated that other suitable rare earth elements may be used, such as praseodymium, neodymium, and the like.

In order to provide an amplifying effect, EDF segment 201 is "pumped" with luminous energy using conventional techniques known in the art. As shown in FIG. 2, EDF segment 201 is optically pumped by pump sources 210, which can be semiconductor laser pump assemblies, such as laser diode pumps or any other suitable pump sources well known in the art. The luminous energy generated by pump sources 210, also referred to as pump light, has a shorter wavelength than any of the wavelengths in the optical signal (i.e., signal light). Optical couplers 212 are used to couple the pump light emitted by pump sources 210 to optical fiber path 202. The use of optical couplers 212 for this purpose is also well-known to those skilled in the art.

It should also be noted that although pump sources 210 are shown in a hybrid bi-directional pump arrangement, other known pump arrangements can also be used without departing from the spirit and scope of the present invention. For example, EDF segment 201 may be pumped using a co-propagating pump configuration (forward pumping) or, alternatively, using a counter-propagating pump configuration (backward pumping), both of which are well-known in the art. For additional background on these pumping arrangements, see U.S. Pat. No. 5,218,608, Optical Fiber Amplifier, issued to Aoki and herein incorporated by reference.

As shown, an optical isolator 215 can also be included, if desired, prior to EDF segment 201. This optional optical isolator 215 can be advantageously used to protect against the undesirable backscattering or back reflection of optical signals which may cause damage to upstream components (e.g., lasers) or which may adversely affect the operation of the upstream components.

Importantly, a directional optical transfer device 220 is disposed along optical fiber path 202 and coupled on the output side of EDF segment 201. Directional optical transfer device 220 can be any suitable device for capturing and transferring optical energy in a directional manner, such as a multi-port optical circulator, a passive optical coupler, and the like. For the embodiments shown in FIGS. 2 and 3, directional optical transfer device 220 will be referred to as optical circulator 220. As shown, optical circulator 220 includes an input port 221 for receiving the amplified optical signal from EDF segment 201, an output port 222 for supplying the amplified optical signal along downstream optical fiber path 202, and a monitor port 223.

In operation, pump sources 210 optically pump EDF segment 201, which in turn supplies the amplified optical signal as an output. The amplified signal exits EDF segment 201 and enters input port 221 of optical circulator 220. Using a clockwise directional transfer implementation as an example configuration, optical circulator 220 circulates the amplified optical signal or signals via output port 222 onto downstream optical fiber path 202. In a typical scenario, a fiber cut, open connector, or other discontinuity problem (referred hereinafter as downstream fault 210) occurs along optical fiber path 202 at a point downstream from EDF segment 201. Downstream fault 210 would cause a reflection of the optical signal having a power level $P_R$ back towards output port 222 of optical circulator 220.

Upon entering output port 222, the reflected optical signal would exit from optical circulator 220 via monitor port 223. Photodetector 230 is coupled to monitor port 223 to receive the reflected signal. Photodetector 230 could be any suitable means known to those skilled in the art (e.g., photodiode) for detecting optical energy and converting the optical signal to an electrical signal. The electrical signal from photodetector 230 is processed through a reflected power monitor 231 which relates the photocurrent of photodetector 230 to the power level of the reflected optical signal in its electrical form. Suitable circuitry for reflected power monitor 231 is also well-known.

Control circuitry is coupled between reflected power monitor 231 and pump sources 210 to provide the necessary control of the optical signal power supplied by EDF segment 201. Control circuitry may comprise analog electrical circuitry, such as inverting amplifier 235, which is used to generate an output signal having a voltage level that is inversely related to that of the reflected optical signal. The output signal from inverting amplifier 235 is then provided to pump controller/driver 211 which adjusts the bias circuitry of pump sources 210 in order to achieve a desired output level of EDF segment 201. More specifically, in the presence of downstream fault 210 occurring in optical fiber path 202, inverting amplifier 235 generates the inverted voltage signal of the reflected optical signal and pump controller/driver 211, in response to the output from inverting amplifier 235, effects the necessary reduction in pump power supplied by pump sources 210 to EDF segment 201.

By using the analog control circuitry described above, the present invention can be used to control the pump power of EDF segment 201 in a continuous and revertive mode without the need for a manual or controller-based reset capability. It should be noted that the analog circuitry shown and described herein is intended to represent just one possible implementation. As such, other known components may be used without departing from the spirit and scope of the present invention.

An additional monitoring tap 240 can be coupled to optical fiber path 202 to support a forward signal monitoring function, typically referred to as performance monitoring. The use of passive optical couplers as monitoring taps is well-known. In general, optical amplifiers sometimes include an optical tap on the output side for tapping off a fraction of the amplified signal in order to monitor the performance of the optical amplifier (e.g., performance monitoring based on output power) as well as the integrity of the outgoing signal (e.g., power level, signal to noise ratio, wavelength, etc.). By way of example, the optical tap can be a passive optical coupler which taps off a fraction, e.g., 1%–10%, of the output signal. Monitoring tap 240 includes a first port for receiving the amplified signal, a second port for coupling a portion of the amplified signal to downstream optical fiber path 202, and a third port coupled to pump controller/driver 211 via photodetector 241 for tapping a fraction of the incoming amplified signal from the first port for performance monitoring as described above.

A network control and management system is normally used in lightwave communication systems to carry out specified control and management functions. As previously described, prior art systems utilize the network control and management system as an integral part of the scheme for controlling the output power of fiber optical amplifiers. In particular, prior art systems utilize supervisory and/or maintenance signals generated through the network control and management system to control the pump power of upstream elements in response to downstream faults. By contrast, the present invention uses the reflected optical power of the optical signal within the transmission path itself to effect the necessary control of output power from EDF segment 201. Accordingly, the embodiments of the present invention do not rely on supervisory signals from network control and management system 250 as do the prior systems. More specifically, optical signal power supplied by EDF segment 201 is adjusted automatically in accordance with the principles of the present invention without signaling from downstream elements via network control and management system 250. Network control and management system 250 is shown in FIG. 2 (dotted lines) only to illustrate the coupling that may exist for carrying out the other normal control and management functions of the system.

According to the principles of the invention, a variable power reduction capability can be provided that corresponds to the amount of reflected optical signal power generated as a result of a discontinuity in the downstream fiber path. As is well-known, the power level of the reflected optical signal will vary as a function of the proximity of the discontinuity in optical fiber path 202 to EDF segment 201. For example, a fiber cut in close proximity to EDF segment 201 will result in a higher reflected power level and thus would require a proportionally higher reduction of pump power from pump sources 202. Accordingly, the present invention can be used to maintain safe output power levels in order to comply with applicable technical and safety standards and, most importantly, to protect maintenance personnel from injury.

As compared with prior art arrangements, another apparent and significant advantage of the previously described embodiments is the absence of an optical isolator coupled on the output side of EDF segment 201. For example, an optical isolator is not required at the output side of EDF segment 201 in the embodiment shown in FIG. 2 because optical circulator 220 itself protects against any backscattering effects from the reflected optical signal. In particular, the reflected power entering output port 222 is circulated to monitor port 223 and not to original input port 221. Consequently, optical circulator 220 provides an inherent isolator function without the need for additional components.

Figure 3:
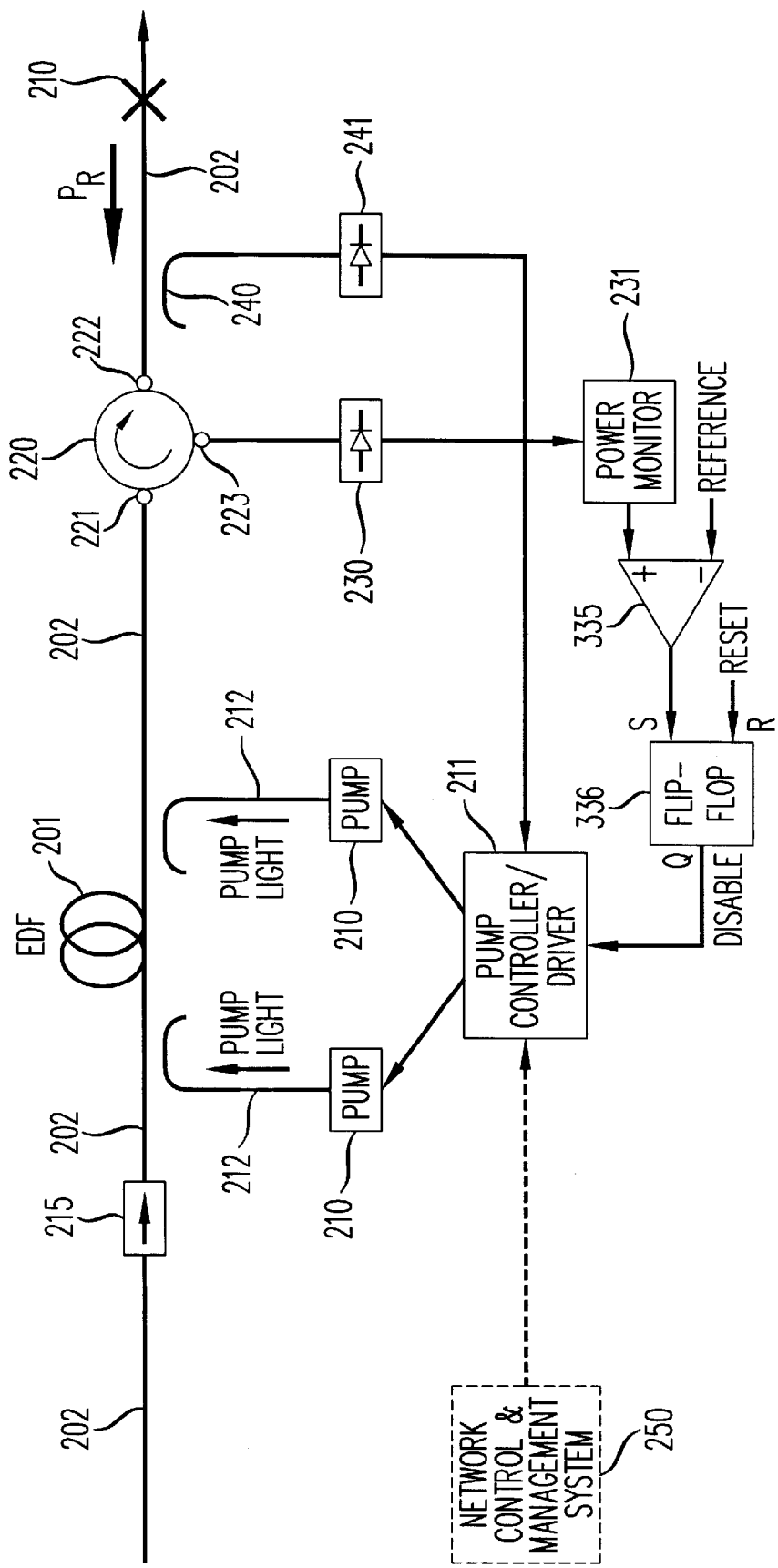
FIG. 3 shows a variation of the embodiment depicted in FIG. 2 useful for achieving complete power reduction.

FIG. 3 shows another embodiment of the present invention which may be advantageously used when it is desirable to implement a complete shutdown of optical signal power supplied by EDF segment 201. Because the embodiment shown in FIG. 3 is a variation of the embodiment depicted in FIG. 2, the description of the relationships and functions for like elements having like reference numerals in FIG. 2 apply equally to those in FIG. 3 and will not be re-stated here for reasons of brevity. In particular, the variation depicted in FIG. 3 relates to the control circuitry coupled between reflected power monitor 231 and pump controller/driver 211 that provides the necessary control of the optical signal power supplied by EDF segment 201. Here, the control circuitry comprises discrete logic elements, namely comparator 335 and flip-flop device 336.

In operation, the power level of the reflected optical signal is measured in reflected power monitor 231, as previously described, and provided as a first input to comparator 335. Comparator 335 compares the power level of the reflected optical signal with a predetermined reference value supplied as a second input to comparator 335. When the reflected optical signal power exceeds the reference level, comparator 335 generates an appropriate output to flip-flop 336. In response, flip-flop 336 generates an appropriate output signal to disable pump sources 210 via pump controller/driver 211, effectively shutting down EDF segment 201. This arrangement is not automatically revertive in that the system would have to be reset manually or by a controller after the discontinuity in the fiber path is repaired or otherwise removed.

It should be noted that the digital circuitry shown and described herein is intended to represent just one possible implementation for the digital control circuitry. As such, other suitable digital circuitry can be used without departing from the spirit and scope of the present invention. For example, a set-reset (S-R) flip-flop is shown, but other conventional logic elements may be equally effective in carrying out the desired function. Additionally, those skilled in the art will understand from the teachings herein that other alternatives are available to provide the pump power control functions performed by the revertive analog circuitry depicted in FIG. 2 or the discrete shutoff logic in FIG. 3. By way of example, the analog functions of inverting amplifier 235 or the discrete functions of comparator 335 and flip-flop 336 may be carried out by microprocessors and associated software or firmware control.

Figure 4:
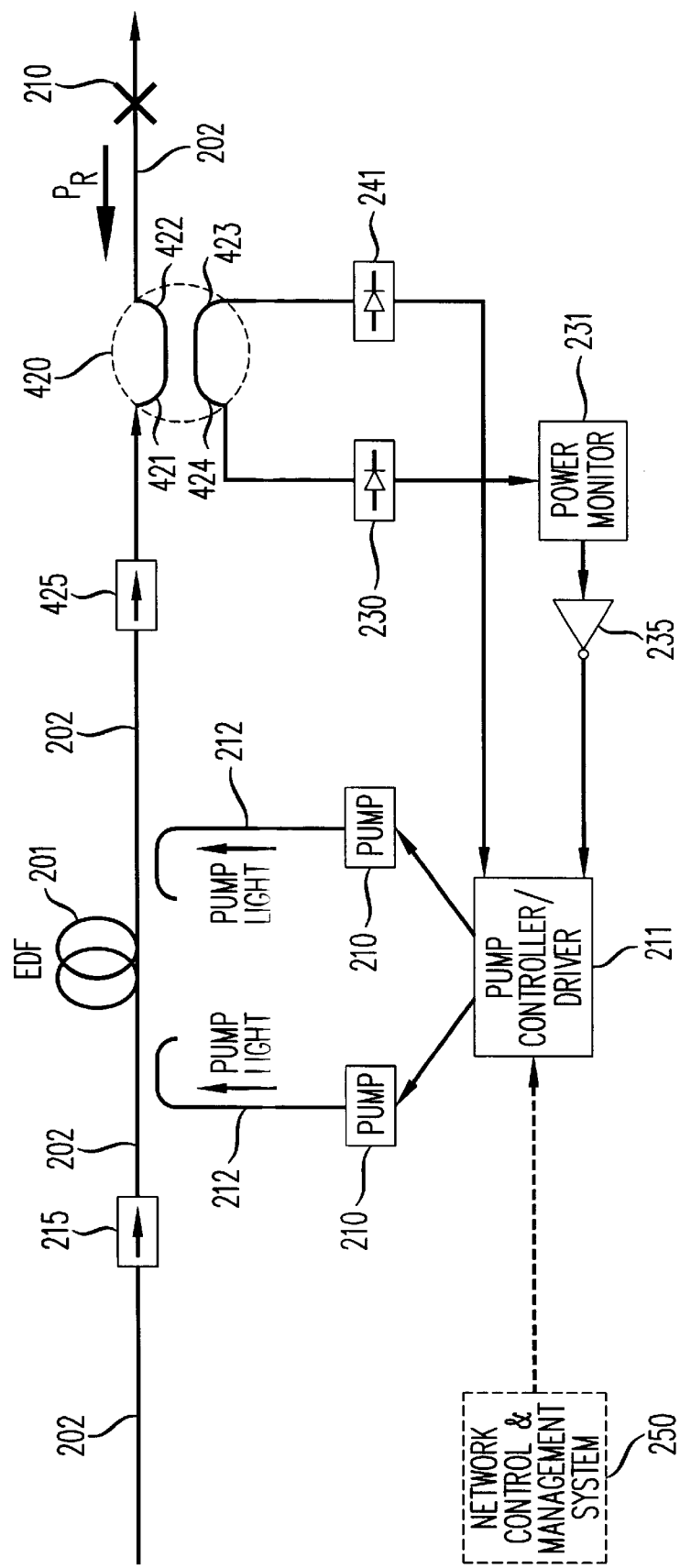
FIG. 4 shows a simplified block diagram of another illustrative fiber optical amplifier arrangement embodying the principles of the present invention.
Figure 5:
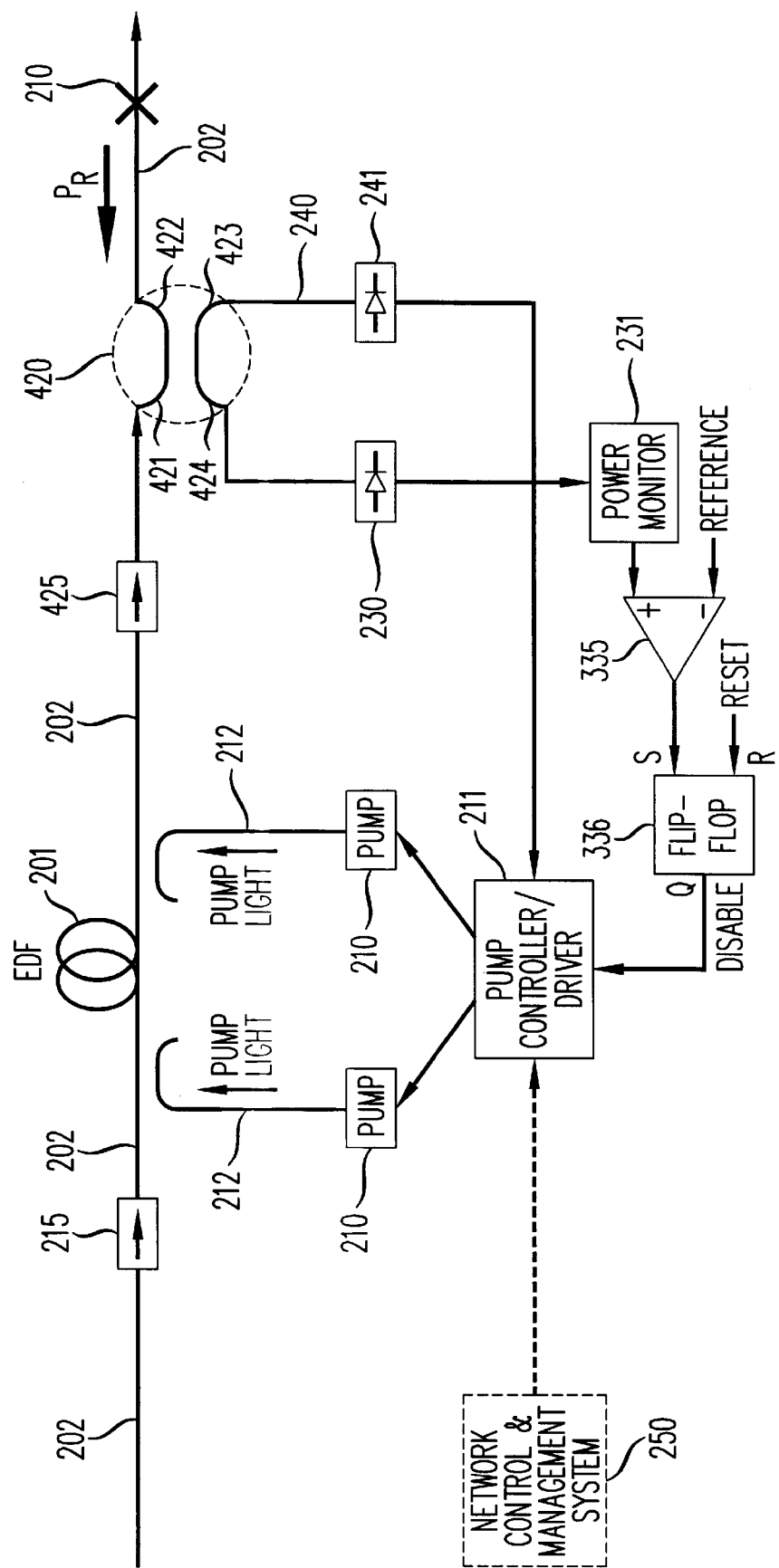
FIG. 5 shows a variation of the embodiment shown in FIG. 4 useful for achieving complete power reduction.

FIGS. 4 and 5 illustrate other embodiments of the present invention in which optical circulator 220 from FIGS. 2 and 3 has been replaced with passive optical coupler 420. Because the embodiments shown in FIGS. 4 and 5 are variations of the embodiments depicted in FIGS. 2 and 3, respectively, the description of the relationships and functions for like elements in FIGS. 2 and 3 apply equally to those in FIGS. 4 and 5 and will not be re-stated here for reasons of brevity.

As shown in FIG. 4, four-port passive optical coupler 420 is disposed along optical fiber path 202 at a point downstream from EDF segment 201. It should be noted that passive optical coupler 420 may be implemented using any of a number of conventional fiber coupler devices known to those skilled in the art. As an example, passive optical coupler 420 can be the same type of optical coupler device used for monitoring tap 240 (FIGS. 2, 3). The basic principles of operation of optical coupler 420 are the same as those previously described for monitoring tap 240 (FIGS. 2, 3), except that optical coupler 420 uses four ports instead of three ports. Using conventional optical coupler devices, it is well-known that the modification to use four ports instead of three has minimal impact with regard to cost or optical loss.

As shown, the first three ports of optical coupler 420 are coupled in a similar manner as that previously described for monitoring tap 240 in FIGS. 2 and 3. Namely, a first port 421 is used for receiving the amplified optical signal from EDF segment 201, a second port 422 is used for coupling a major portion of the amplified signal to downstream optical fiber path 202, and a third port 423 is coupled to pump controller/driver 211 via photodetector 241 to tap a fraction of the incoming amplified signal from the first port for performance monitoring in the same way as that previously described for the embodiments shown in FIGS. 2 and 3. Additionally, a fourth port 424 of optical coupler 420 is coupled to photodetector 230 which is further coupled to reflected power monitor 231 as in the FIGS. 2 and 3.

In contrast to optical circulator 220 (FIGS. 2 and 3), optical coupler 420 is a passive device and, as a result, optical isolator 425 may be needed to prevent any undesirable backscattering or back reflection of optical energy. The remaining elements shown in FIGS. 4 and 5 are the same as those described for the previous embodiments. Because only a fraction of the reflected optical signal power is tapped off at port 424, the amount of reflected optical signal power measured by reflected power monitor 231 will typically be less in this embodiment than that reflected through optical circulator 220 (FIGS. 2 and 3) since optical circulator 220 circulates substantially all the reflected optical energy to reflected power monitor 231. Additionally, if the fiber cut is located at a greater distance downstream from EDF segment 201, the reflected optical energy could be even less. As such, more sensitive monitoring may be required in this embodiment.

FIG. 5 represents a combination of the embodiments shown in FIGS. 3 and 4, wherein passive optical coupler 420 is used in place of optical circulator 220 as previously described in FIG. 4, and comparator 335 and flip-flop 336 are used in place of inverting amplifier 235 as previously described in FIG. 3.

It will be understood that particular embodiments described above are only illustrative of the principles of the present invention, and that various modifications could be made by those skilled in the art without departing from the spirit and scope of the present invention. For example, although optical circulators and passive optical couplers were described in the above embodiments, those skilled in the art will recognize that other suitable components or circuitry may be used for capturing and transferring the reflected optical energy generated from a downstream fiber fault. Similarly, the particular implementation of the control circuitry for processing the reflected optical energy can be modified without departing from the principles of the present invention.

As previously described, the principles of the present invention may also be advantageously used to control optical signal power supplied by other optical components even though the above embodiments were described only in the context of fiber optical amplifiers. For example, the present invention can be used to control the output power levels of semiconductor optical amplifiers by controlling the electrical current that is supplied to "pump" the semiconductor device. The present invention can also be used to reduce or shut off power from sources and transmitters (e.g., in a transmit terminal) in response to downstream faults in a fiber path. Accordingly, the scope of the present invention is limited only by the claims that follow.

What is claimed is:

1. A method for controlling optical signal power supplied by a network element disposed along an optical fiber path, the method comprising the steps of:

at an upstream position, sensing a downstream fault in the optical fiber path as a function of reflected optical signal power, wherein the reflected optical signal power corresponds to a downstream reflection of an optical signal supplied by the network element; and when the downstream fault has been sensed and, responsive only to the reflected optical signal power, automatically and variably reducing the optical signal power of the optical signal supplied by the network element at the upstream position by a predetermined amount such that harm from an optical signal emanating at the downstream fault is substantially reduced.

2. The method according to claim 1, wherein the step of reducing the optical signal power includes the steps of:

generating a control signal; and supplying the control signal to the network element for reducing an output power level of the network element below a predetermined level.

3. The method according to claim 2, wherein the network element comprises a fiber optical amplifier for supplying an amplified optical signal in the optical fiber path, wherein the step of reducing the optical signal power includes the step of automatically reducing pump power supplied by a pump source coupled to the fiber optical amplifier in response to the control signal, wherein the optical signal power of the amplified optical signal is correspondingly reduced as a function of the reduction of pump power.

4. A method for controlling optical signal power supplied by a network element disposed along an optical fiber path, the method comprising the steps of:

at an upstream position, sensing a downstream fault in the optical fiber path as a function of reflected optical signal power, wherein the reflected optical signal power corresponds to a downstream reflection of an optical signal supplied by the network element; and when the downstream fault has been sensed and, responsive only to the reflected optical signal power, automatically and variably reducing the optical signal power of the optical signal supplied by the network element at the upstream position by a predetermined amount by introducing a predetermined amount of loss into the optical fiber path to reduce the optical signal power below a predetermined level such that harm from an optical signal emanating at the downstream fault is substantially reduced.

5. An apparatus for controlling optical signal power supplied by a network element disposed along an optical fiber path, the apparatus comprising:

a control circuit coupled to the optical fiber path at an upstream position, the control circuit being responsive to a reflected optical signal generated in the optical fiber path, wherein the reflected optical signal corresponds to a downstream reflection of an optical signal supplied by the network element, wherein, responsive only to the power level of the reflected optical signal exceeding a predetermined threshold indicative of fault occurrence, the control circuit automatically and variably reduces the optical signal power of the optical signal supplied by the network element at the upstream position by a predetermined amount, wherein the predetermined amount is based only on the power level of the reflected optical signal.

6. An apparatus for controlling optical signal power of an optical signal supplied by a network element disposed along an optical fiber path, the apparatus comprising:

a control circuit coupled to the optical fiber path at an upstream position, the control circuit including an optical circulator for receiving a reflected optical signal generated in the optical fiber path, the control circuit being responsive to optical signal power of the reflected optical signal, the reflected optical signal corresponding to a downstream reflection of the optical signal supplied by the network element, wherein, responsive only to the optical signal power of the reflected optical signal exceeding a predetermined threshold indicative of fault occurrence, the control circuit automatically and variably reduces the optical signal power of the optical signal supplied by the network element at the upstream position by a predetermined amount, wherein the predetermined amount is based only on the power level of the reflected optical signal.

7. The apparatus according to claim 5, wherein the control circuit is coupled to the network element, and wherein, when a downstream fault occurs, the control circuit communicates with the network element to automatically reduce an output power level of the network element below a predetermined level.

8. An apparatus for controlling optical signal power supplied by a network element disposed along an optical fiber path, the apparatus comprising:

a control circuit coupled to the optical fiber path at an upstream position, the control circuit being responsive to a reflected optical signal generated in the optical fiber path, the reflected optical signal corresponding to a downstream reflection of an optical signal supplied by the network element, wherein, responsive only to the power level of the reflected optical signal exceeding a predetermined threshold indicative of fault occurrence, the control circuit automatically and variably reduces the optical signal power of the optical signal supplied by the network element at the upstream position by a predetermined amount by introducing a predetermined amount of loss into the optical fiber path to reduce the optical signal power below a predetermined level.

9. The apparatus according to claim 7, wherein the control circuit includes a directional optical transfer device having a first port coupled to the optical fiber path at an output of the network element for receiving an optical signal, a second port coupled to the optical fiber path for supplying the optical signal to a downstream location, wherein the second port also receives the reflected optical signal generated as a result of the downstream fault.

10. The apparatus according to claim 9, the directional optical transfer device also having a third port, and wherein the control circuit further comprises a detector element coupled to the third port of the directional optical transfer device for detecting the reflected optical signal, a monitor element coupled to the detector element for monitoring reflected optical signal power, and a controller element coupled between the monitor element and the network element for controlling the output power of the network element based only on the reflected optical signal power.

11. The apparatus according to claim 10, wherein the detector element comprises a photodetector for detecting and converting the reflected optical signal power to an electrical signal, and the monitor element comprises a power monitor for measuring the power level of the electrical signal.

12. The apparatus according to claim 11, wherein the controller element comprises an analog electrical circuit.

13. The apparatus according to claim 12, wherein the analog electrical circuit includes an inverting amplifier having an input port and an output port, the input port being coupled to the power monitor, the inverting amplifier being operable to generate an output signal having a voltage inversely related to the reflected optical signal, wherein the output power of the network element is reduced in a revertive mode in response to the inverting amplifier output signal.

14. The apparatus according to claim 5, further comprising a forward monitoring tap disposed along the optical fiber path at a point downstream from an output of the network element, the forward monitoring tap being coupled to the control circuit, wherein a portion of the optical signal supplied by the network element is tapped by the forward monitoring tap and provided as input to the control circuit for monitoring characteristics of the optical signal.

15. The apparatus according to claim 11, wherein the controller element is a microprocessor operating under program control.

16. The apparatus according to claim 5, wherein the control circuit further comprises:

an optical isolator device having an input coupled to an output of the network element; and a passive optical coupler having a first port coupled to an output of the optical isolator, a second port coupled to the optical fiber path for supplying the optical signal to a downstream location, wherein the second port also receives the reflected optical signal generated from the downstream fault.

17. The apparatus according to claim 5, wherein the network element is an optical amplifier selected from the group consisting of a semiconductor optical amplifier and a fiber optical amplifier.

18. The apparatus according to claim 5, wherein the network element is an optical power source.

19. The apparatus according to claim 17, wherein the control circuit is further coupled to a pump source of the fiber optical amplifier, wherein, when the downstream fault occurs, the control circuit communicates with the pump source to automatically reduce pump power supplied by the pump source to the fiber optical amplifier so that the optical signal power of the amplified optical signal supplied by the fiber optical amplifier is reduced accordingly.

20. The apparatus according to claim 19, wherein the fiber optical amplifier comprises an erbium-doped optical fiber.

21. In a lightwave communication system having a network element for supplying an optical signal along an optical fiber path, an apparatus for reducing the output power of the network element in the presence of a fault occurring downstream from the network element in the optical fiber path, the apparatus comprising:

a directional optical transfer device coupled to the optical fiber path at a position downstream from the network element;

a means, coupled to the directional optical transfer device, for detecting and monitoring a power level of a reflected optical signal generated in the optical fiber path, wherein the reflected optical signal corresponds to a downstream reflection of an optical signal supplied by the network element; and a means, coupled between the detecting and monitoring means and the network element, for controlling the output power of the network element based only on the power level of the reflected optical signal, wherein, responsive only to the power level of the reflected optical signal exceeding a predetermined threshold indicative of fault occurrence, the controlling means communicates with the network element to automatically and variably reduce the output power level of the optical signal supplied by the network element by a predetermined amount, wherein the predetermined amount is based only on the power level of the reflected optical signal.

22. An apparatus for controlling optical signal power supplied by a network element disposed along an optical fiber path, the apparatus comprising:

a control circuit coupled to the optical fiber path at an upstream position, the control circuit being responsive to a reflected optical signal generated in the optical fiber path, wherein the reflected optical signal corresponds to a downstream reflection of an optical signal supplied by the network element; and a lossy element coupled to the optical fiber path, wherein, when optical signal power of the reflected optical signal exceeds a predetermined threshold indicative of fault occurrence, the lossy element, responsive to the control circuit, introduces a predetermined amount of loss into the optical fiber path to automatically and variably reduce the optical signal power at the upstream position by a predetermined amount, wherein the predetermined amount is based only on the optical signal power of the reflected optical signal.

* * * * *